(12) United States Patent
Iijima (10) Patent No.: US 11,828,738 B2
(45) Date of Patent: Nov. 28, 2023

(54) DETECTOR FOR LIQUID CHROMATOGRAPH

(71) Applicant: SHIMADZU CORPORATION, Kyoto (JP)

(72) Inventor: Yuki Iijima, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 178 days.

(21) Appl. No.: 17/567,250

(22) Filed: Jan. 3, 2022

(65) Prior Publication Data

US 2022/0244225 A1  Aug. 4, 2022

(30) Foreign Application Priority Data

Feb. 2, 2021  (JP) .................................. 2021-015157

(51) Int. Cl.
  *G01N 30/64* (2006.01)
  *G01N 30/26* (2006.01)
  *G01N 30/02* (2006.01)

(52) U.S. Cl.
  CPC ............. *G01N 30/64* (2013.01); *G01N 30/26* (2013.01); *G01N 2030/027* (2013.01); *G01N 2030/645* (2013.01); *G01N 2201/022* (2013.01)

(58) Field of Classification Search
  CPC ............. G01N 30/26; G01N 30/62–78; G01N 2030/027; G01N 2030/3084;

(Continued)

(56) References Cited

U.S. PATENT DOCUMENTS 3,276,243 A * 10/1966 Karas ..................... G01N 30/30
  73/23.25
4,771,628 A * 9/1988 Sisti ....................... G01N 30/30
  73/23.39

(Continued)

FOREIGN PATENT DOCUMENTS

CN     101151189 A    3/2008
JP     2000-009709 A  1/2000

(Continued)

OTHER PUBLICATIONS

Office Action in corresponding Chinese Patent Application No. 202210030090.3 dated Jul. 28, 2023, with English machine translation.

*Primary Examiner* — Justin N Olamit
(74) *Attorney, Agent, or Firm* — Renner, Otto, Boisselle & Sklar, LLP (57) ABSTRACT

A detector for a liquid chromatograph, includes a detector that detects components in liquid, a pipe that guides liquid to the detector, a casing that contains at least part of the pipe and the detector and has a bottom portion, and a thermal insulator provided on the bottom portion in the casing, wherein a discharge port is provided in the bottom portion of the casing, the thermal insulator has an upper surface and a lower surface, a first opening is provided in the upper surface of the thermal insulator, and a second opening is provided in the lower surface of the thermal insulator to overlap with the discharge port in a plan view, a flow path that guides liquid from the first opening to the second opening is provided in the thermal insulator, and the flow path has a bend portion.

5 Claims, 5 Drawing Sheets

(58) Field of Classification Search
CPC ....... G01N 2030/645; G01N 2201/022; G01N 2223/3106
See application file for complete search history.

(56) References Cited

U.S. PATENT DOCUMENTS

| | | | |
|---|---|---|---|
| 6,248,158 B1 * | 6/2001 | Abdel-Rahman | G01N 30/30 95/87 |
| 11,293,907 B2 * | 4/2022 | Sawata | G01N 30/64 |
| 11,428,676 B2 * | 8/2022 | Nakama | G01N 30/12 |
| 2010/0155460 A1 | 6/2010 | Mehta | |
| 2011/0045957 A1 | 2/2011 | Mehta | |
| 2019/0369066 A1 | 12/2019 | Sawata | |

FOREIGN PATENT DOCUMENTS

| | | |
|---|---|---|
| JP | 3136221 U | 10/2007 |
| WO | 2018/150562 A1 | 8/2018 |

* cited by examiner

DETECTOR FOR LIQUID CHROMATOGRAPH

BACKGROUND

Technical Field

The present invention relates to a detector for a liquid chromatograph.

Description of Related Art

In a liquid chromatograph, a detector such as an electric conductance detector is used to detect sample components in a liquid mobile phase. In the electrical conductance detector, an amount of change in value of a current flowing through liquid is detected as a chromatogram. In WO 2018/150562 A1, an electrical conductance detector used in an ion chromatograph that is one type of a liquid chromatograph is described.

With the electrical conductance detector described in WO 2018/150562 A1, a pipe, a heater and a detection device are provided in a casing. The heater is controlled such that a mobile phase in a pipe connected to the detection device is at a predetermined temperature.

SUMMARY

In the detector for a liquid chromatograph, in a case where a fastening force of connection portions of pipes in the casing is not sufficient, or a high pressure is applied to the pipes, liquid in the pipe may leak in the casing.

A cylindrical tube projecting to outside of the casing from inside of the casing may be provided to discharge the liquid that has leaked in the casing outwardly of the casing. In this case, when the temperature outside of the casing is transferred into the casing through the tube, stability of temperature in the casing is impaired. Therefore, the diameter of the tube is required to be reduced. As a result, it is difficult for the liquid that has leaked in the casing to be discharged smoothly and outwardly of the casing.

An object of the present invention is to provide a detector for a liquid chromatograph, that can discharge liquid that has leaked in a casing smoothly and outwardly of the casing while ensuring stability of temperature in the casing of a detector with a simple configuration.

A detector for a liquid chromatograph, according to one aspect, includes a detector that detects components in liquid, a pipe that guides liquid to the detector, a casing that contains at least part of the pipe and the detector and has a bottom portion, and a thermal insulator provided on the bottom portion in the casing, wherein a discharge port is provided in the bottom portion of the casing, the thermal insulator has an upper surface and a lower surface, a first opening is provided in the upper surface of the thermal insulator, and a second opening is provided in the lower surface of the thermal insulator to overlap with the discharge port in a plan view, a flow path that guides liquid from the first opening to the second opening is provided in the thermal insulator, and the flow path has a bend portion.

Other features, elements, characteristics, and advantages of the present disclosure will become more apparent from the following description of preferred embodiments of the present disclosure with reference to the attached drawings.

DETAILED DESCRIPTION

A detector for a liquid chromatograph, according to embodiments of the present invention will be described below in detail with reference to the drawings.

(1) Configuration of Liquid Chromatograph

Figure 1:
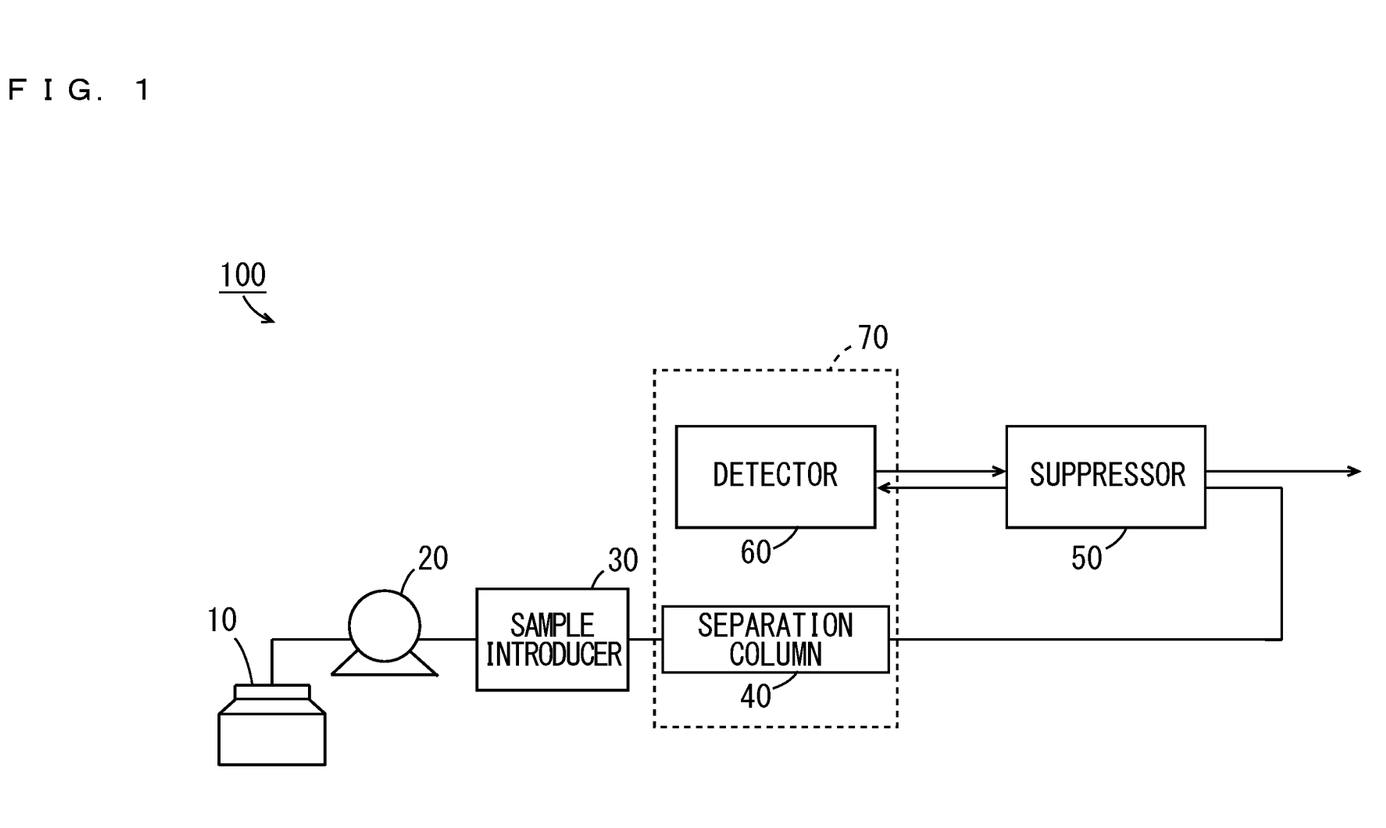
FIG. 1 is a diagram showing the configuration of a liquid chromatograph including a detector for a liquid chromatograph according to one embodiment.

FIG. 1 is a diagram showing the configuration of a liquid chromatograph including the detector for a liquid chromatograph, according to one embodiment. The liquid chromatograph according to the present embodiment is an ion chromatograph.

The liquid chromatograph 100 of FIG. 1 includes a pump 20, a sample introducer 30, a separation column 40, a suppressor 50, an electrical conductance detector (hereinafter abbreviated as a detector) 60 and a column oven 70. The separation column 40 and the detector 60 are contained in the column oven 70.

The pump 20 sucks an eluent from an eluent container 10 and guides the sucked eluent to the separation column 40. The sample introducer 30 introduces a sample into the eluent guided to the separation column 40 from the pump 20. Thus, the eluent and the sample are introduced into the separation column 40. The separation column 40 separates the introduced sample into components. The eluent including the sample that has been separated into components is introduced into the suppressor 50. Further, the eluent led out from the suppressor 50 is introduced into the suppressor 50 again through the detector 60 and then discarded.

The suppressor 50 includes an ion exchange membrane. The suppressor 50 exchange ions which are not to be analyzed out of ions in the eluent introduced from the separation column 40 and ions which are to be analyzed out of ions in the eluent introduced from the detector 60 through the ion exchange membrane. Thus, the eluent from which unnecessary ion components that are not be analyzed are removed is guided to the detector 60. The detector 60 detects sample components in the eluent.

(2) Configuration of Detector 60

Figure 2:
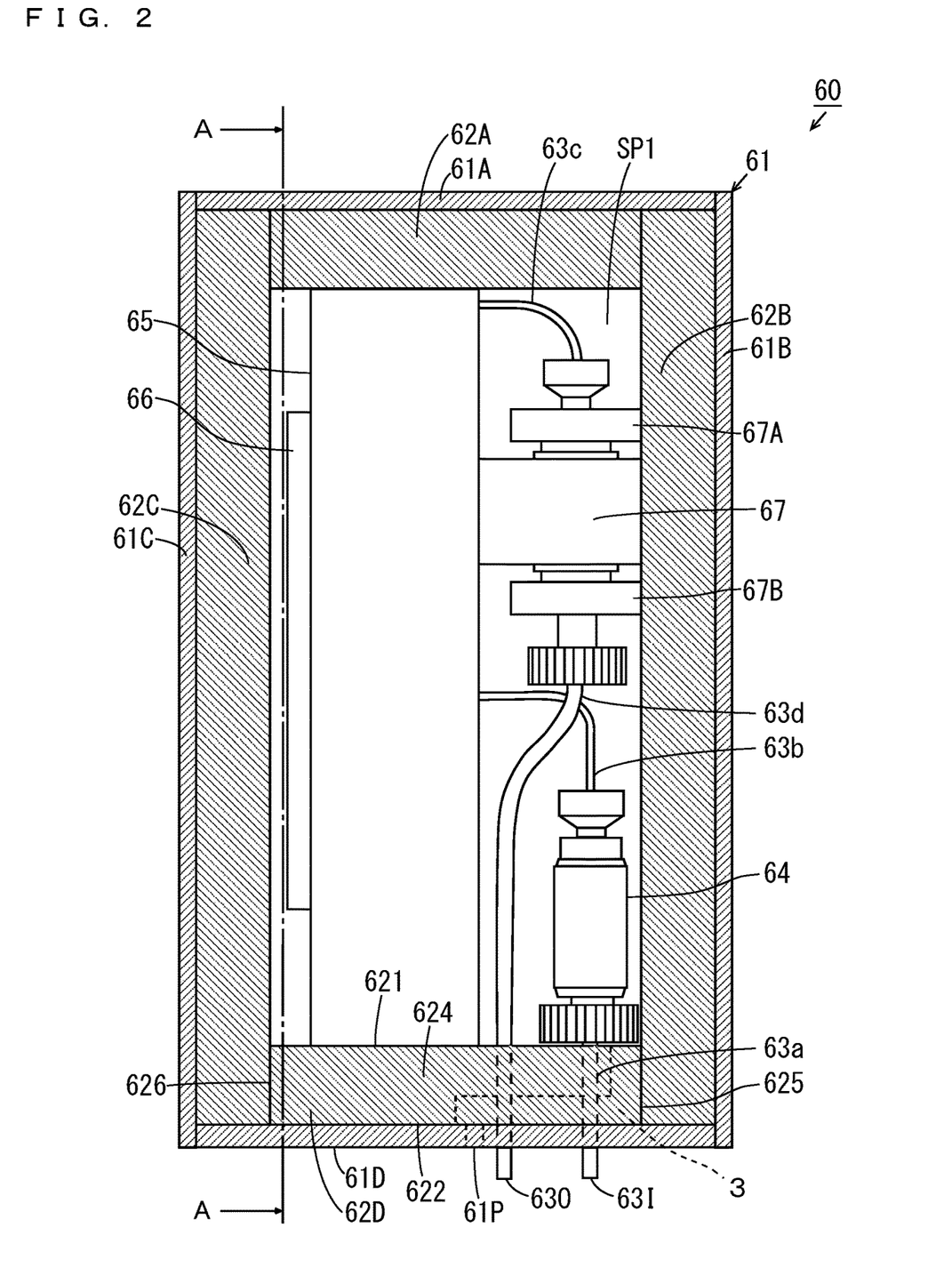
FIG. 2 is a schematic cross sectional front view showing the configuration of a detector.
Figure 3:
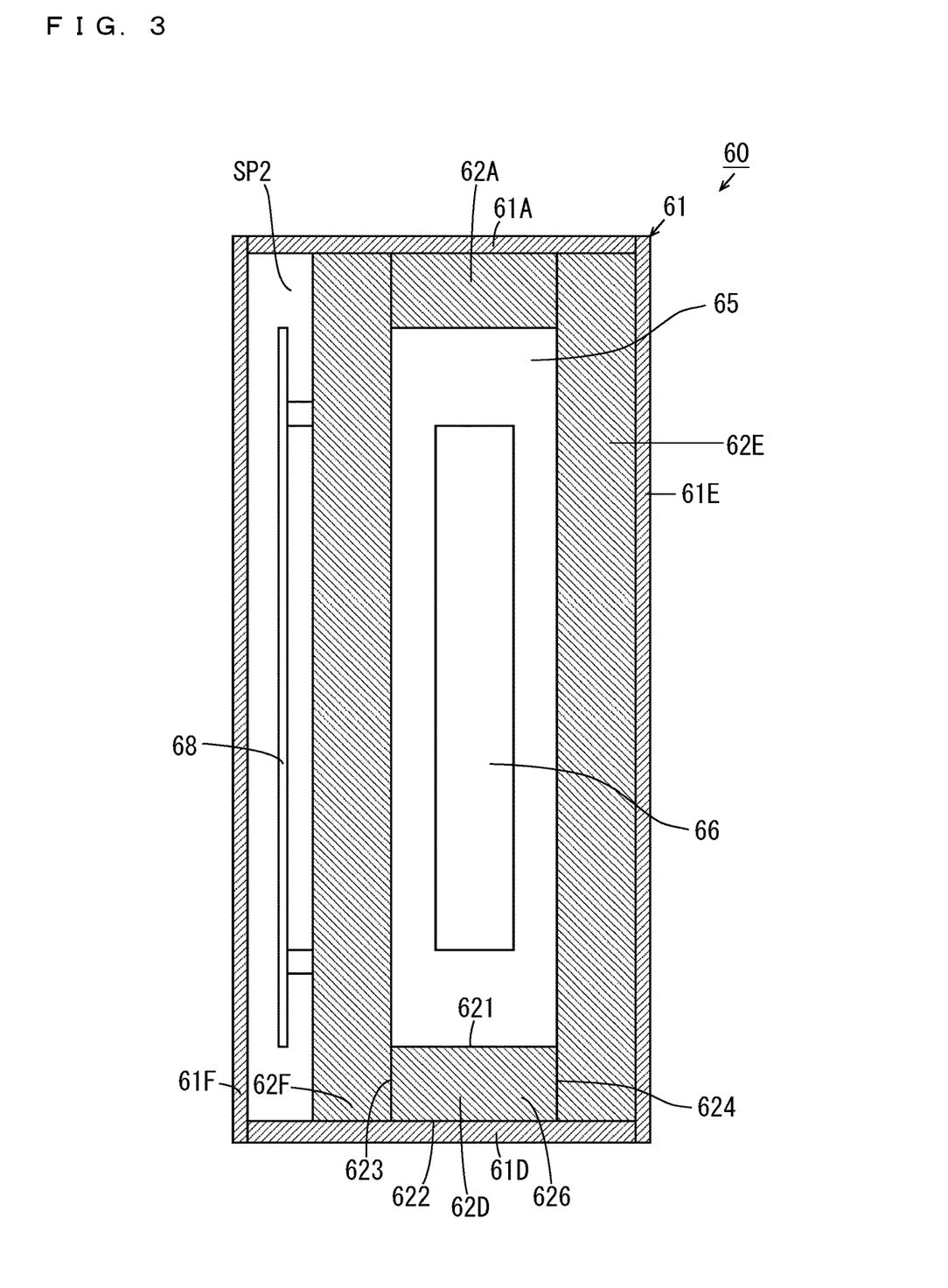
FIG. 3 is a cross sectional view of the detector taken along the line A-A of FIG. 2.

FIG. 2 is a schematic front cross sectional view showing the configuration of the detector 60. FIG. 3 is a cross sectional view of the detector 60 taken along the line A-A of FIG. 2. As shown in FIG. 2, the detector 60 includes a casing 61, a plurality of plate-shape thermal insulators 62A to 62F, a plurality of pipes 63a to 63d, a coupling 64, a heat exchange block 65, a temperature adjuster 66, a detector 67 and a circuit board 68 (see FIG. 3). The detector 67 has electrodes 67A, 67B.

As shown in FIGS. 2 and 3, the casing 61 is constituted by an upper plate 61A, side plates 61B, 61C, a bottom plate 61D, a front plate 61E and a back plate 61F. A discharge port 61P is formed in the bottom plate 61D. In the present embodiment, the discharge port 61P is formed at the intermediate position between the side plate 61B and the side plate 61C of the casing 61 in a plan view.

The thermal insulators 62A to 62E are respectively arranged to extend along the upper plate 61A, the side plates 61B, 61C, the bottom plate 61D and the front plate 61E in the casing 61. As shown in FIG. 3, the thermal insulator 62F is arranged to be opposite to the back plate 61F in the casing 61. As shown in FIG. 2, an inner space SP1 surrounded by the thermal insulators 62A to 62F is formed in the casing 61.

Further, as shown in FIG. 3, an inner space SP2 is formed between the back plate 61F and the thermal insulator 62F of the casing 61 in the casing 61.

As shown in FIGS. 2 and 3, the thermal insulator 62D has an upper surface 621, a lower surface 622, a pair of side surfaces 623, 624 and a pair of end surfaces 625, 626. The upper surface 621 and the lower surface 622 extend in parallel with the bottom plate 61D. The pair of side surfaces 623, 624 and the pair of end surfaces 625, 626 extend vertically with respect to the bottom plate 61D. The lower surface 622 of the thermal insulator 62D is arranged to come into contact with the bottom plate 61D. The side surfaces 623, 624 of the thermal insulator 62D are respectively arranged to come into contact with the thermal insulators 62F, 62E. The end surfaces 625, 626 of the thermal insulator 62D are respectively arranged to come into contact with the thermal insulators 62B, 62C. A flow path 3 is formed in the thermal insulator 62D. Details of the flow path 3 will be described below.

In the inner space SP1 of the casing 61, the plurality of pipes 63a to 63d, the coupling 64, the heat exchange block 65, the temperature adjuster 66 and the detector 67 are contained. In the inner space SP2 in the casing 61, the circuit board 68 is contained.

The pipe 63a penetrates the bottom plate 61D and the thermal insulator 62D from outside of the casing 61 to extend inwardly of the casing 61. One end of the pipe 63a outside of the casing 61 is referred to as a pipe inlet 63l. The other end of the pipe 63a is connected to one end of the coupling 64. The pipe 63b is drawn out from the heat exchange block 65. The end portion of the pipe 63b is connected to the other end of the coupling 64. The pipe 63c is drawn out from the heat exchange block 65. The end portion of the pipe 63c is inserted into the detector 67 through the electrode 67A.

The pipe 63d is drawn out through the electrode 67B from the detector 67. The pipe 63d penetrates the thermal insulator 62D and the bottom plate 61D to extend outwardly of the casing 61. The end portion of the pipe 63d is referred to as a pipe outlet 63o.

An eluent guided from the suppressor 50 to the pipe inlet 63l is guided to the heat exchange block 65 through the coupling 64 and the pipe 63b. The temperature adjuster 66 maintains the temperature of the heat exchange block 65 at a predetermined temperature. Thus, the temperature of the eluent flowing through the pipe in the heat exchange block 65 is maintained constant. In this state, the eluent led out from the heat exchange block 65 is guided to the detector 67 through the pipe 63c. A voltage is applied to the electrodes 67A, 67B. In this state, a change in current value in accordance with an ion concentration of the eluent flowing between the electrode 67A and the electrode 67B is measured. Thus, a change in current value is measured as a change in electrical conductance, so that sample components in the eluent are detected. The eluent led out from the detector 67 is guided to the pipe outlet 63o through the pipe 63d to be introduced into the suppressor 50.

Figure 4:
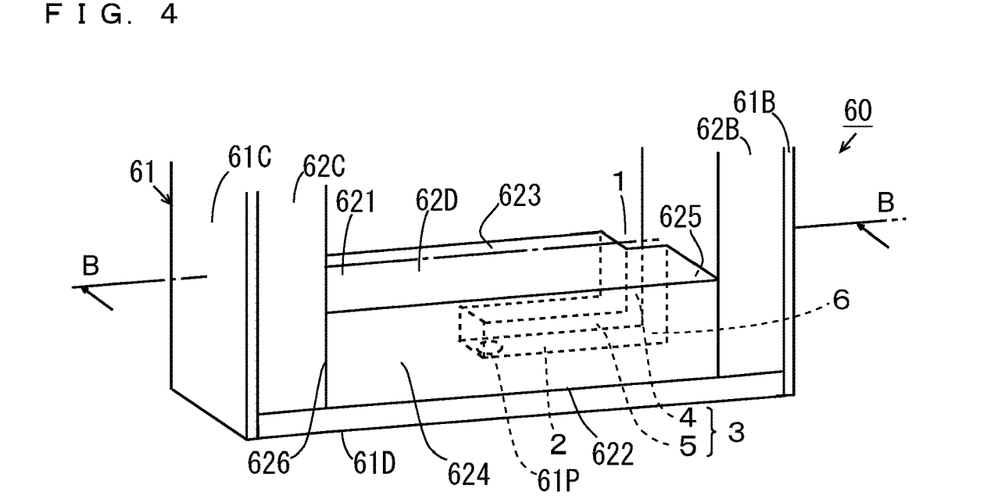
FIG. 4 is mainly a schematic perspective view of a thermal insulator as viewed from the front with a front plate of the detector of FIG. 3 being detached.
Figure 5:
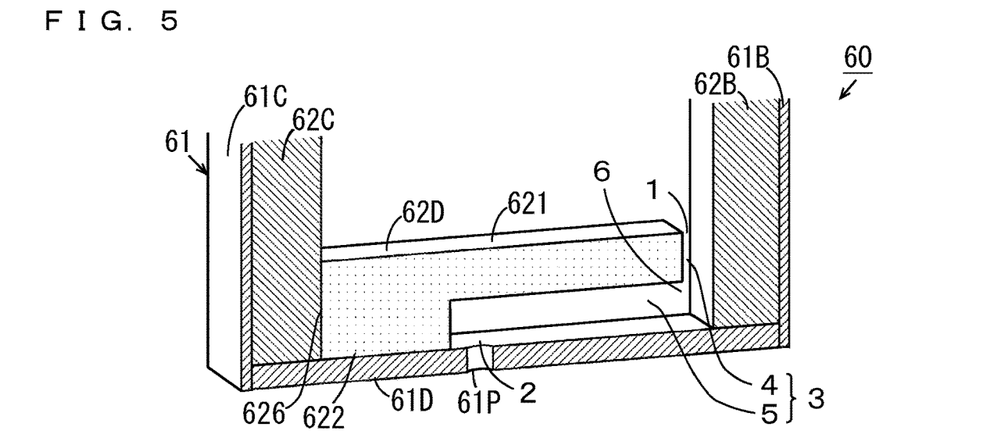
FIG. 5 is a schematic perspective view showing the cross section taken along the line B-B of FIG. 4.
Figure 6:
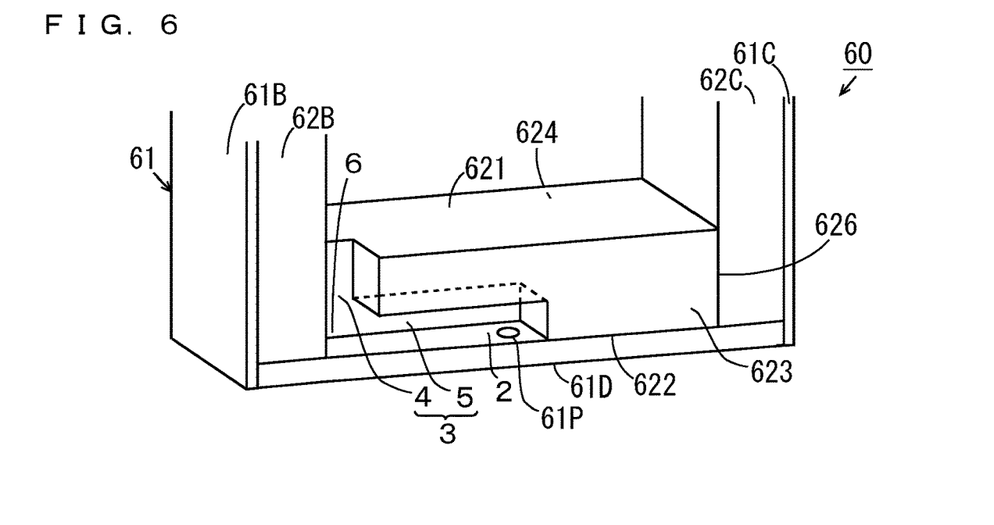
FIG. 6 is mainly a schematic perspective view of the thermal insulator as viewed from the back with a back plate of the detector of FIG. 3 being detached.

FIG. 4 is mainly a schematic perspective view of the thermal insulator 62D as viewed from the front with the front plate 61E of the detector 60 of FIG. 3 being removed. FIG. 5 is a schematic perspective view showing a cross section taken along the line B-B of FIG. 4. FIG. 6 is mainly a schematic perspective view of the thermal insulator 62D as viewed from the back with the back plate 61F of the detector 60 of FIG. 3 being removed.

Figure 7:
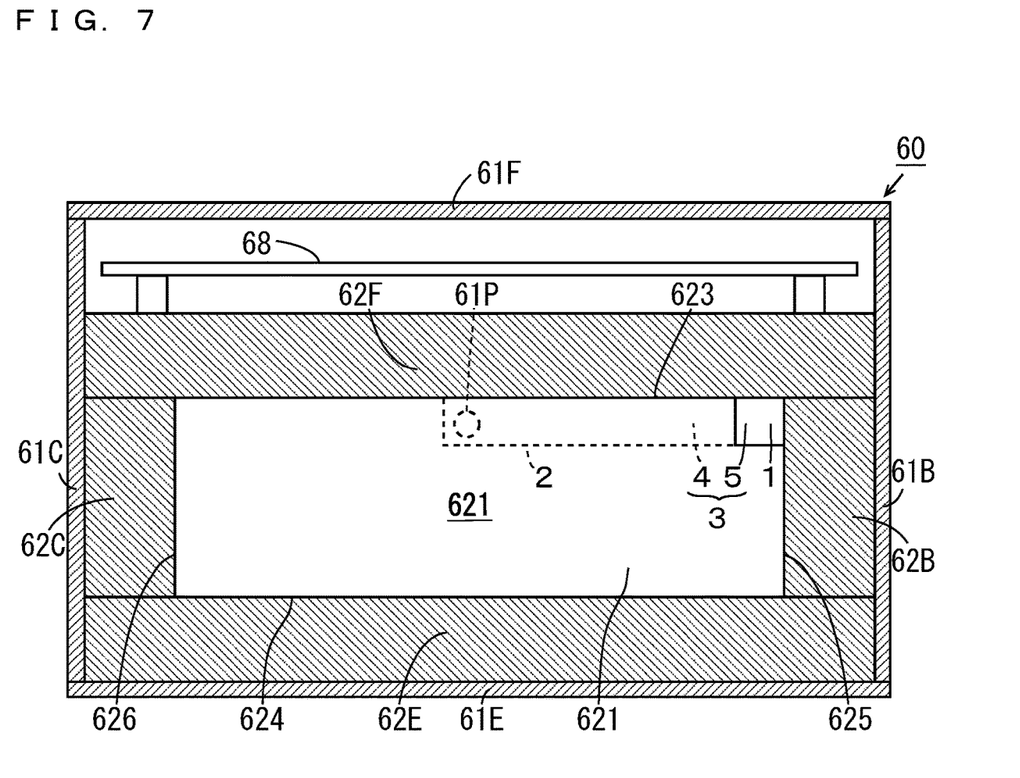
FIG. 7 is a schematic cross sectional view of the detector in a case where the thermal insulator of the detector of FIG. 3 is seen in plan view.

FIG. 7 is a schematic cross sectional view of the detector 60 in a case where the thermal insulator 62D of the detector 60 of FIG. 3 is seen in plan view.

As shown in FIG. 7, a first opening 1 is provided in the upper surface 621 of the thermal insulator 62D not to overlap with the discharge port 61P of the bottom plate 61D of the casing 61 in a plan view. In the present embodiment, the first opening 1 is a rectangular cutout formed in a corner portion in which the side surface 623 and the end surface 625 of the thermal insulator 62D intersect with each other.

A second opening 2 is provided in the lower surface 622 of the thermal insulator 62D to overlap with the discharge port 61P of the bottom plate 61D of the casing 61 in a plan view. In the present embodiment, the second opening 2 is a strip-shaped cutout extending to the end surface 625 along the side surface 623 of the thermal insulator 62D. Part of the second opening 2 overlaps with the discharge port 61P. Further, the flow path 3 for guiding liquid from the first opening 1 to the second opening 2 is provided in the thermal insulator 62D. As shown in FIG. 6, in the present embodiment, the flow path 3 is a concave portion formed in the side surface 623 of the thermal insulator 62D. The concave portion extends to connect the first opening 1 and the second opening 2 to each other. The concave portion that constitutes the flow path 3 includes a first cutout portion 4 formed in the side surface 623 and the end surface 625 of the thermal insulator 62D, and a second cutout portion 5 formed in the side surface 623 and the lower surface 622 of the thermal insulator 62D. The first cutout portion 4 is equivalent to a first portion extending downwardly from the first opening 1. The second cutout portion 5 is equivalent to a second portion extending in a horizontal direction from the second opening 2. A bend portion 6 is formed between the first cutout portion 4 and the second cutout portion 5. Thus, the flow path 3 includes the first portion extending in the up-and-down direction and the second portion extending in the horizontal direction.

The first portion of the flow path 3 is formed of the side surface of the thermal insulator 62B and the inner surface of the first cutout portion 4 of the thermal insulator 62D. The second portion of the flow path 3 is formed of the upper surface of the bottom plate 61D and the inner surface of the second cutout portion 5 of the thermal insulator 62D.

(3) Effects of Embodiments

With the detector 60 according to the present embodiment, the liquid that has leaked from the connection portions of the pipes 63a to 63d in the casing 61 is guided to the second opening 2 through the flow path 3 from the first opening 1 of the thermal insulator 62D on the bottom plate 61D by gravity and discharged outwardly of the casing 61 through the discharge port 61P of the bottom plate 61D. In this case, because the flow path 3 has the bend portion 6, it is difficult for heat from outside air to be transferred into the casing 61. Therefore, the effects of a thermal disturbance on the temperature in the casing 61 is suppressed. As a result, the liquid that has leaked in the casing 61 can be discharged smoothly and outwardly of the casing 61 while stability of temperature in the casing 61 is ensured with a simple configuration.

Further, because the first opening 1 does not overlap with the discharge port 61P of the bottom plate 61D in a plan view, it is possible to form the bend portion 6 in the flow path 3 between the first opening 1 and the second opening 2 without complicating the structure of the flow path 3.

Further, because the first cutout portion 4 and the second cutout portion 5 that constitute the flow path 3 are exposed to the side surface 623 of the thermal insulator 62D, the flow path 3 can be easily formed in the thermal insulator 62D.

In particular, the first cutout portion 4 is formed to extend in the up-and-down direction, and the second cutout portion 5 is formed to extend in the horizontal direction from the second opening 2. Thus, the flow path 3 can be easily formed of the first cutout portion 4 extending along the side surface 623 and the end surface 625 of the thermal insulator 62D, and the second cutout portion 5 extending along the side surface 623 and the lower surface 622 of the thermal insulator 62D.

Further, because the liquid that has leaked in the casing 61 is guided downwardly through the first cutout portion 4 from the first opening 1 by gravity, the leaked liquid smoothly flows to the second opening 2. Further, because heat from outside air is transferred in the horizontal direction through the second cutout portion 5, it is difficult for heat from outside air to reach the first opening 1. Thus, it is possible to discharge the liquid that has leaked in the casing 61 smoothly and outwardly of the casing 61 while sufficiently ensuring stability of the temperature in the casing 61 with a simple configuration.

Figure 8:
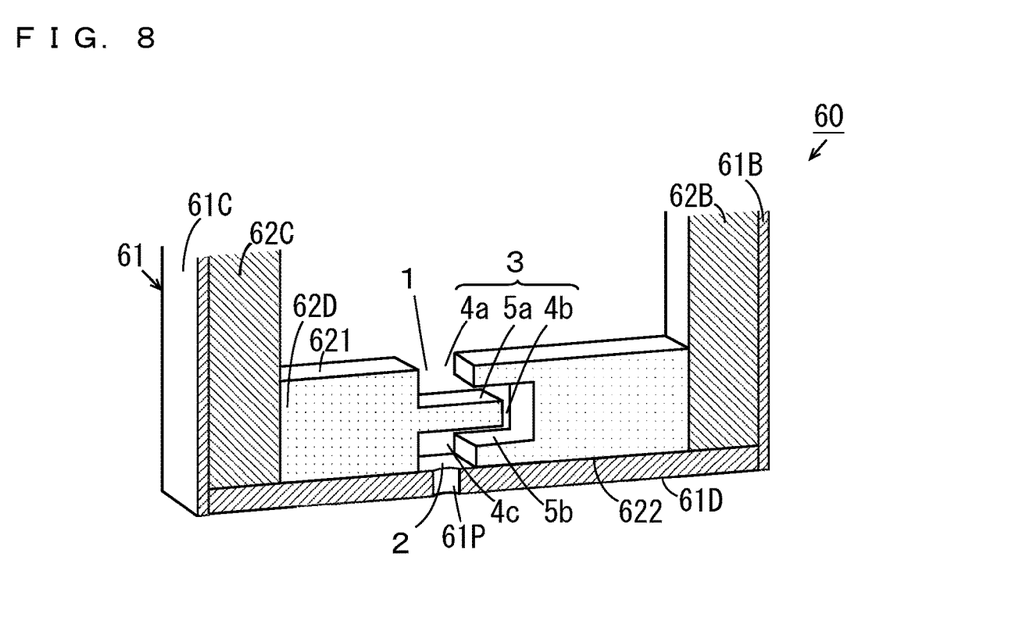
FIG. 8 is a schematic perspective view showing another example of a flow path provided in a thermal insulator.

(4) Other Embodiments (a) While the first opening is provided at a position that does not overlap with the discharge port 61P in a plan view in the above-mentioned embodiment, the present invention is not limited to this. FIG. 8 is a schematic perspective view showing another example of a flow path provided in a thermal insulator 62D. In the example of FIG. 8, a first opening 1 is provided to overlap with a discharge port 61P of a bottom plate 61D in a plan view. A flow path 3 is formed of a cutout portion 4a extending in the up-and-down direction, a cutout portion 5a extending in the horizontal direction, a cutout portion 4b extending in the up-and-down direction, a cutout portion 5b extending in the horizontal direction and a cutout portion 4c extending in the up-and-down direction.

The cutout portion 4a, the cutout portion 5a, the cutout portion 4b, the cutout portion 5b and the cutout portion 4c are sequentially coupled to one another. The coupling portion between the cutout portion 4a and the cutout portion 5a is a bend portion, and the coupling portion between the cutout portion 5a and the cutout portion 4b is a bend portion. The coupling portion between the cutout portion 4b and the cutout portion 5b is a bend portion, and the coupling portion between the cutout portion 5b and the cutout portion 4c is a bend portion. In the flow path 3 of the present example, it is more difficult for heat from outside air to be transferred into a casing 61.

(b) While the flow path 3 is constituted by the first cutout portion 4 formed to extend along the side surface 623 and the end surface 625 of the thermal insulator 62D, and the second cutout portion 5 formed to extend along the side surface 623 and the lower surface 622 of the thermal insulator 62D in the above-mentioned embodiment, the configuration of the flow path 3 is not limited to this. For example, a flow path 3 may be constituted by a concave portion formed in a side surface 623 of a thermal insulator 62D.

Further, a flow path 3 may be formed inside of a thermal insulator 62D. Further, one of first and second portions of the flow path 3 may be formed in a side surface 623 of a thermal insulator 62D, and the other one of the first and second portions may be formed inside of the thermal insulator 62D.

(c) A first cutout portion 4 may extend to be inclined with respect to the up-and-down direction. Further, a second cutout portion 5 may extend to be inclined with respect to the horizontal direction. In this case, the second cutout portion 5 is preferably inclined such that the height of a downstream portion is lower than the height of an upstream portion. Thus, the leaked liquid flows easily by gravity.

(d) While the detector 60 is the electrical conductance detector in the above-mentioned embodiment, a detector 60 may be another detector such as a fluorescence detector or a differential refractometer.

(5) Aspects

It is understood by those skilled in the art that the plurality of above-mentioned illustrative embodiments are specific examples of the below-mentioned aspects.

(Item 1) A detector for a liquid chromatograph, according to one aspect may include a detector that detects components in liquid, a pipe that guides liquid to the detector, a casing that contains at least part of the pipe and the detector and has a bottom portion, and a thermal insulator provided on the bottom portion in the casing, wherein a discharge port may be provided in the bottom portion of the casing, the thermal insulator may have an upper surface and a lower surface, a first opening may be provided in the upper surface of the thermal insulator, and a second opening may be provided in the lower surface of the thermal insulator to overlap with the discharge port in a plan view, a flow path that guides liquid from the first opening to the second opening may be provided in the thermal insulator, and the flow path has a bend portion.

With the detector for a liquid chromatograph, according to one aspect, the liquid that has leaked from the connection portions of the pipes in the casing is guided to the second opening through the flow path from the first opening of the thermal insulator on the bottom portion and is discharged outwardly of the casing through the discharge port of the bottom portion. In this case, because the flow path has the bend portion, it is difficult for heat from outside air to be transferred into the casing. Therefore, the effects of a thermal disturbance on the temperature in the casing is suppressed. As a result, the liquid that has leaked in the casing can be discharged smoothly and outwardly of the casing while stability of temperature in the casing is ensured with a simple configuration.

(Item 2) The detector for a liquid chromatograph, according to item 1, wherein the first opening may be provided at a position that does not overlap with the discharge port in a plan view.

With the detector for a liquid chromatograph, according to item 2, it is possible to form a bend portion in the flow path between the first opening and the second opening without complicating the structure of the flow path.

(Item 3) The detector for a liquid chromatograph, according to item 1 or 2, wherein the thermal insulator may have a side surface, and the flow path may include a concave portion extending along the side surface of the thermal insulator to connect the first opening and the second opening to each other.

With the detector for a liquid chromatograph, according to item 3, because the concave portion that constitutes the flow path is exposed to the surface of the thermal insulator, the flow path can be easily formed in the thermal insulator.

(Item 4) The detector for a liquid chromatograph, according to item 3, wherein the thermal insulator may have an end surface, the concave portion may have a first cutout portion formed in the side surface and the end surface and a second cutout portion formed in the side surface and the lower surface, and the first cutout portion and the second cutout portion may be coupled to each other to form the bend portion. With the detector for a liquid chromatograph, according to item 4, the flow path can be easily formed of the first cutout portion extending along the side surface and the end surface of the thermal insulator and the second cutout portion extending along the side surface and the lower surface of the thermal insulator.

(Item 5) The detector for a liquid chromatograph, according to any one of items 1 to 4, wherein the flow path may have a first portion extending in an up-and-down direction from the first opening and a second portion extending in a direction that intersects with the up-and-down direction from the second opening.

With the detector for a liquid chromatograph, according to item 5, because the leaked liquid is guided downwardly through the first portion by gravity, the leaked liquid flows smoothly to the second opening. Further, because heat from outside air is transferred in a direction that intersects with the up-and-down direction through the second portion, it is difficult for the heat from outside air to reach the first opening. Thus, the liquid that has leaked in the casing can be discharged smoothly and outwardly of the casing while stability of temperature in the casing is ensured sufficiently with a simple configuration.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

I claim:

1. A detector for a liquid chromatograph, comprising:
   a detector that detects components in liquid;
   a pipe that guides liquid to the detector;
   a casing that contains at least part of the pipe and the detector and has a bottom portion; and
   a thermal insulator provided on the bottom portion in the casing, wherein
   a discharge port is provided in the bottom portion of the casing,
   the thermal insulator has an upper surface and a lower surface,
   a first opening is provided in the upper surface of the thermal insulator, and a second opening is provided in the lower surface of the thermal insulator to overlap with the discharge port in a plan view,
   a flow path that guides liquid from the first opening to the second opening is provided in the thermal insulator, and
   the flow path has a bend portion.

2. The detector for a liquid chromatograph, according to claim 1, wherein
   the first opening is provided at a position that does not overlap with the discharge port in a plan view.

3. The detector for a liquid chromatograph, according to claim 1, wherein
   the thermal insulator has a side surface, and
   the flow path includes a concave portion extending along the side surface of the thermal insulator to connect the first opening and the second opening to each other.

4. The detector for a liquid chromatograph, according to claim 3, wherein
   the thermal insulator has an end surface,
   the concave portion has a first cutout portion formed in the side surface and the end surface and a second cutout portion formed in the side surface and the lower surface, and
   the first cutout portion and the second cutout portion are coupled to each other to form the bend portion.

5. The detector for a liquid chromatograph, according to claim 1, wherein
   the flow path has a first portion extending in an up-and-down direction from the first opening and a second portion extending in a direction that intersects with the up-and-down direction from the second opening.

* * * * *